United States Patent [19]

Sisson et al.

[11] 4,023,863
[45] May 17, 1977

[54] SWAY CONTROL SYSTEM FOR A TOW VEHICLE-TRAILER COMBINATION

[75] Inventors: Albert E. Sisson; Robert A. Essad, both of Southfield, Mich.

[73] Assignee: The Bendix Corporation, South Bend, Ind.

[22] Filed: Nov. 24, 1975

[21] Appl. No.: 634,692

[52] U.S. Cl. .............................. 303/7; 180/103 BF; 188/112; 303/20
[51] Int. Cl.[2] ........................................ B60T 13/08
[58] Field of Search .................... 180/103 BF, 104; 188/3 R, 112; 280/432, 446 B; 303/7, 20

[56] References Cited

UNITED STATES PATENTS

| | | | |
|---|---|---|---|
| 3,758,165 | 9/1973 | Savelli | 303/7 X |
| 3,790,807 | 2/1974 | Rossigno | 303/7 |
| 3,861,489 | 1/1975 | Lang et al. | 303/7 X |
| 3,908,782 | 9/1975 | Lang et al. | 303/7 X |
| 3,948,567 | 4/1976 | Kasselmann et al. | 303/7 |

*Primary Examiner*—Stephen G. Kunin
*Attorney, Agent, or Firm*—Leo H. McCormick, Jr.; William N. Antonis

[57] ABSTRACT

A solenoid operated distribution valve for supplying a servomotor in a trailer with a sway control braking signal in response to a sway signal being evaluated in a comparator. A wave spring surrounds the plunger of the solenoid to nullify the movement thereof such that the output force which operates the distribution valve is a direct function of the sway signal.

9 Claims, 5 Drawing Figures

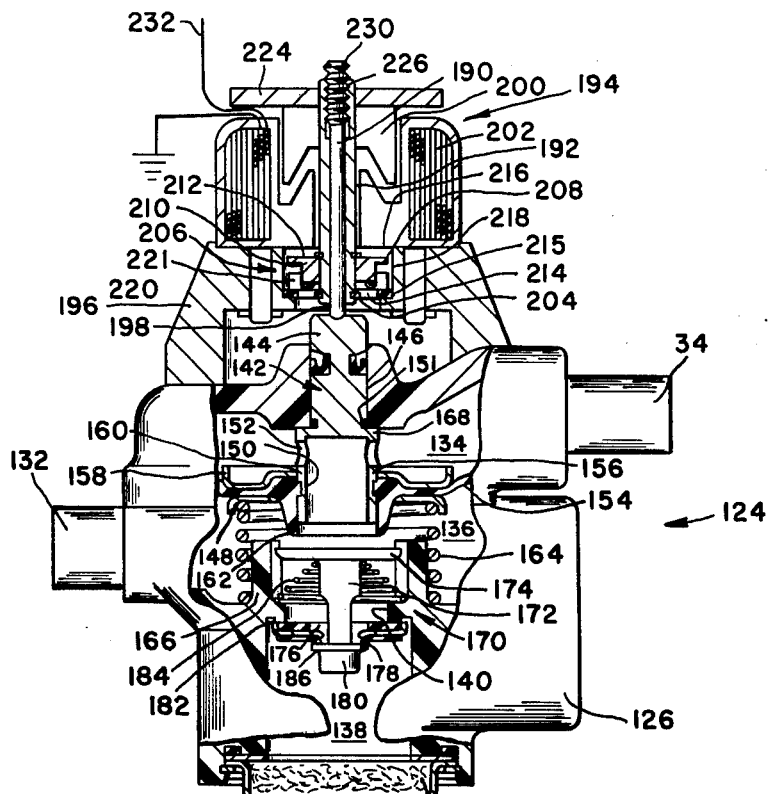
FIG. 2
FIG. 3
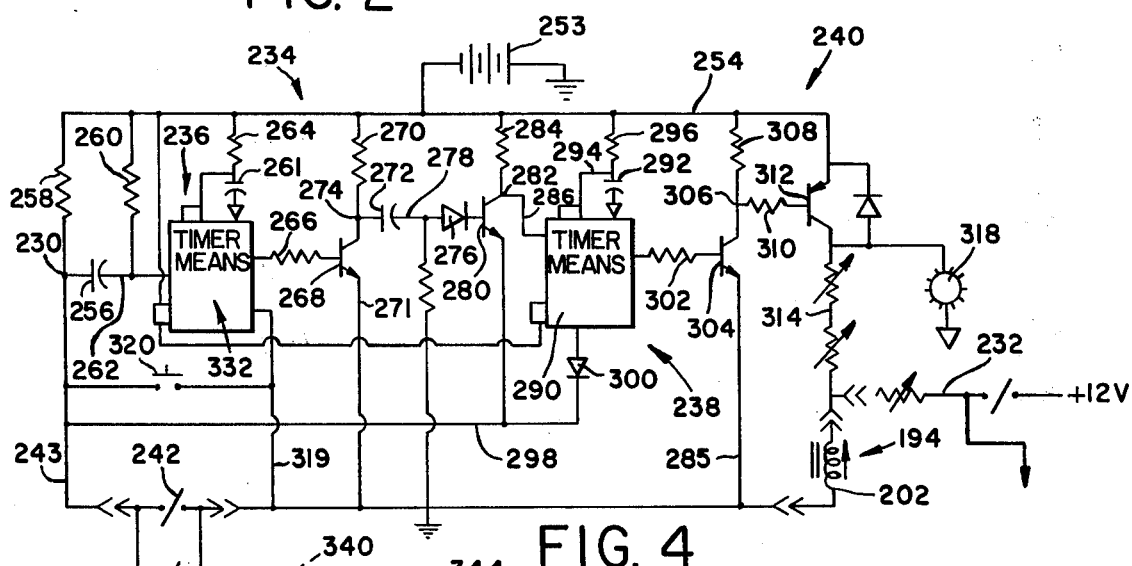
FIG. 4
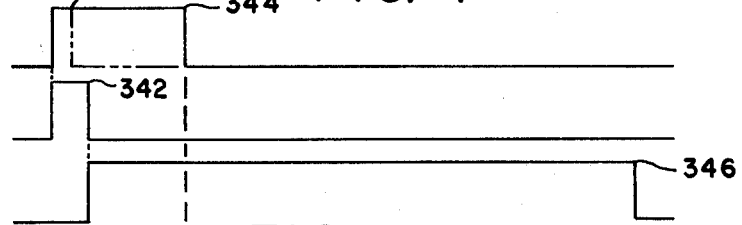
FIG. 5

SWAY CONTROL SYSTEM FOR A TOW VEHICLE-TRAILER COMBINATION

BACKGROUND OF THE INVENTION

With an ever increasing number of people purchasing reactional vehicles. It is of the utmost importance that stability between the tow vehicle and the trailer be maintained while traveling at turnpike speeds. One form of instability exhibited by these vehicles in swaying, where the trailer oscillates back and forth similar to a pedulum. Another stability problem can occur during a quick lane change. This can result in severe yawing in the trailer which can lead to loss of control of the tow vehicle. Similar yawing can be caused by passing or being passed by a semi-trailer or by a qusty crosswind. In addition, tow vehicle-trailer combinations have a critical speed above which control is difficult or impossible to uniformly maintain. This critical speed is usually somewhat slower than the desired speed for highway driving creating a hindrance for a smooth traffic flow pattern.

To alleviate these sway stability problems some of the larger trailers are equipped with damping or spring devices attached to the hitch. These damping devices normally consist of at least one shock absorber located on opposite sides of the tongue of the trailer. These devices improve trailer control at low speeds, but do not affect the critical speed so that the safe speed is still limited.

In addition, stiffening of the sidewalls of the tires on the trailer have helped to dampen some of the sway forces when traveling at low speeds. However, it has been found that at high speeds the damping characteristics of the tires have little overall effect on the total oscillatory movement of the trailer.

In U.S. Pat. No. 3,893,692, incorporated herein by reference, an antisway apparatus is disclosed which has a comparator that can supply an actuation signal for applying a servomotor in the trailer when an oscillary force reaches a predetermined value. A first sensor is located in the front and a second sensor is located in the rear of the trailer while the pneumatic comparator is located at the center of gravity of the vehicle. As long as the first and second sensors supply substantially the same pressure indication of movement in the trailer, the comparator remains inactive. However, due to the cost and critical limitations necessary to properly install the first and second sensors and time of response, this approach has not received substantial industry approval.

In U.S. Pat. Application Ser. No. 549,406 and now U.S. Pat. No. 3,946,567 a sway control device is disclosed wherein weight means responsive to oscillary force developed in a trailer moves a cam actuator which allows air to enter into and operate a brake applying servomotor in a trailer. However, because of the response time due to the mass required by weight means this device also has not yet received substantial industry acceptance.

SUMMARY OF THE INVENTION

We have devised a sway control means for use in a tow vehicle-trailer braking system. In this sway control means a mercury switch is located on an angle in the trailer. The mercury switch an electrical voltage to be transmitted to a comparator when the lateral forces on the trailer reach a predetermined value. The electrical voltage is compared to a reference sway signal and if the time duration is equal to the reference sway signal, an operational signal is sent to timing circuit to sustain an operational signal up to 1.5 seconds. An amplifier means takes this operational signal and transmit a sway control signal sufficient to operate a solenoid means in a housing in the trailer. The solenoid has a plunger which moves to open an atmospheric port and allow air to create a pressure differential across a wall means in the brake applying servomotor in the trailer. A wave spring associated with the plunger modifies the movement of the same in order that the output force of the solenoid is directly proportional to the voltage supplied to the coil. Upon the comparator receiving a reference sway signal, an indicator light informs an operator that operational conditions of the tow vehicle-trailer could be impaired if a reduction in speed does not occur. However, the trailer brakes are not automatically applied to oppose the sway if the duration of the sway signal is not sufficient or does not match a reference control signal. If the operation of the sway control means hinders the operation of the tow vehicle-trailer, and on-off switch allows an operator to disengage the sway control means from the trailer braking system.

It is therefore the object of this invention to provide a tow vehicle-trailer braking system with electrical sensors to monitor the lateral movement of the trailer ad transmit a sway signal to a comparator where an evaluation is made with a reference signal to determine if a sway control signal should operate a solenoid valve which permits a pressure differential to be created in a brake applying servomotor in the trailer.

It is another object of this invention to provide a tow vehicle-trailer with a sway control means having a solenoid valve with a spring means which resists movement of a plunger such that the output force is directly proportional to the voltage supplied an operating coil therein.

It is another object of this invention to provide a tow vehicle-trailer braking system with a comparator means which will evaluate a sway with a reference signal to determine if a sway control signal should be transmitted to a solenoid operated valve in a servomotor in the trailer and thereby terminate any lateral forces from which the sway signal is derived.

These and other objects will become apparent from reading this specification and viewing the drawing.

BRIEF DESCRIPTION OF THE DRAWINGS

FIG. 2 is a sectional view of the solenoid operated control valve of the sway control means of FIG. 1.

FIG. 3 is a perspective view of the resilient means which regulates the output force of the solenoid.

FIG. 4 is a schematic illustration of the electrical circuit utilized in the sway control means of FIG. 1.

FIG. 5 is an illustration of the sensors for the sway control of FIG. 1.

DETAILED DESCRIPTION OF THE PREFERRED EMBODIMENT

Figure 1:
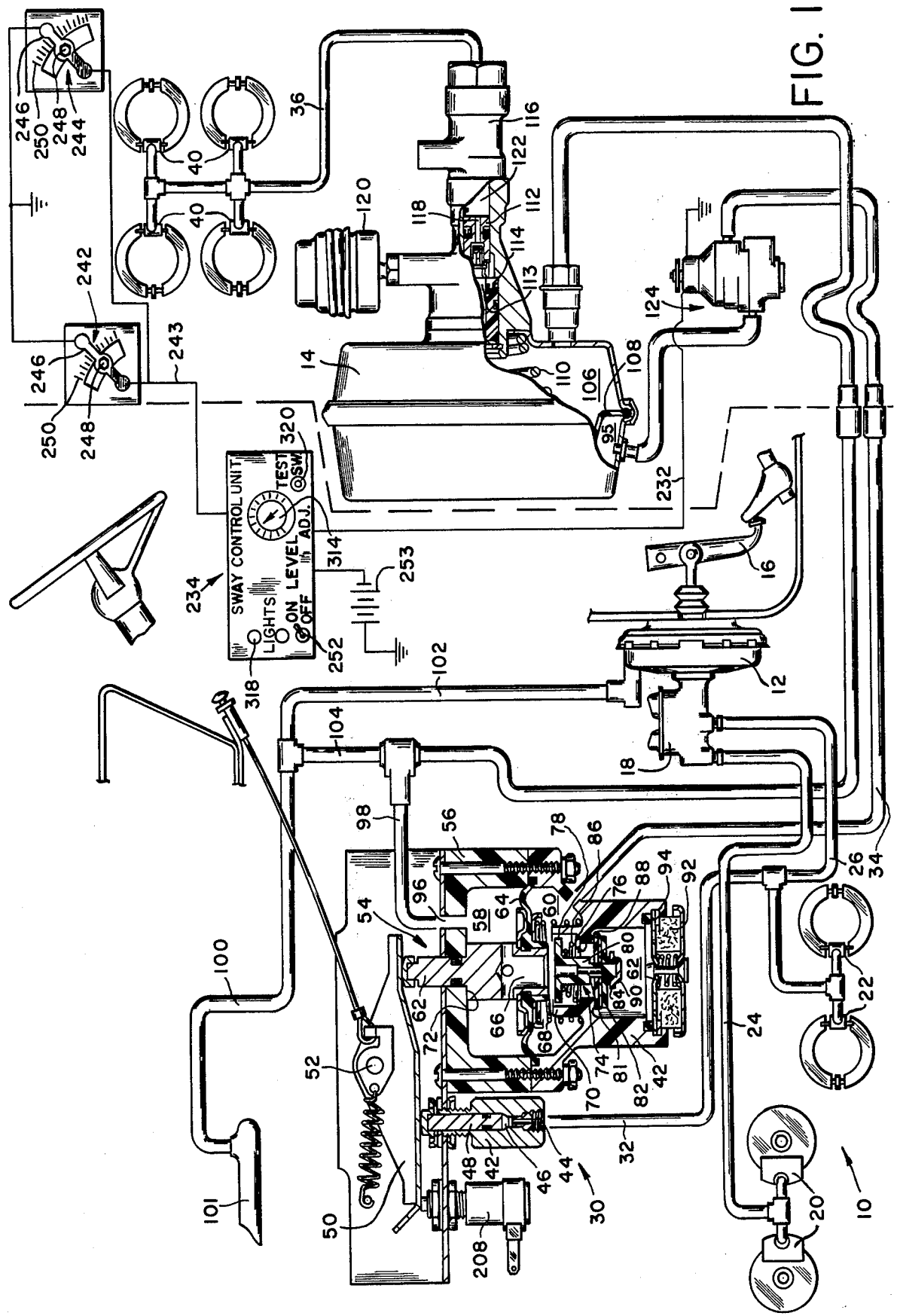
FIG. 1 is a schematic illustration of a tow vehicle-trailer combination showing a sway control means which can attenuate lateral forces in the trailer created through road and speed conditions.

A tow vehicle-trailer braking system 10, shown in FIG. 1 has a first brake applying servomotor 12 in the tow vehicle and a second brake applying servomotor 14 in the trailer. The first brake applying servomotor 12 is actuated by an operator input applied to pedal 16. The pedal 16 upon moving operates the servomotor 12 to provide master cylinder 18 with a force to move a pressure producing piston means therein and supply the front wheel brakes 20 through conduit 24, and the rear wheel brakes 22, through conduit 26, of the tow vehicle with a braking force.

Conduit 26 is connected to a relay control means 30 by a conduit 32. The braking force supplied the rear wheels 22 is converted by the relay control means into a trailer braking signal and carried on conduit 34 to operate the second brake applying servomotor 14. Upon actuation of the second brake applying servomotor 14, a trailer braking force is supplied through conduit 36 to the wheel brakes 40 in the trailer.

The relay control means 30 has a housing 42 with a bore 46 in which a piston 48 is located. An entrance port 44 is connected to conduit 32 and to supply piston 48 with hydraulic fluid under pressure. The fluid under pressure move piston 48 into contact with lever arm 50. The lever arm 50 is mounted on pin 52 and transmits an output signal to a valve means 54.

The valve means 54 has a housing 56 with a vacuum chamber 58, a control chamber 60, and an atmospheric chamber 62. A diaphragm 64 separates the vacuum chamber 58 from the control chamber 60. A shaft 62 which extends through the housing 56 into the vacuum chamber is attached to the diaphragm 64. A passageway 66 located in shaft 62 connects the vacuum chamber 58 with the control chamber 60. A spring 68 which surrounds a guide 70 on the housing 52 in the control chamber 60 urges shoulder 72 against the housing in the vacuum chamber 58.

A poppet valve means 74 is located within the guide 70 for regulating the communication of air at atmospheric pressure between the atmospheric chamber 62 and the control chamber 60 through opening 76. The poppet valve means 74 has a disc 78 attached to a stem 80. A plate 82 is loosely located on stem 80 and retained there by cap 84. A spring 86, located between the housing surrouding opening 76 ad the disc 78, urges the cap 84 against a first seat 88 and the plate 82 against a second seat 90 to seal the control chamber 60 from the atmospheric chamber 62.

A filter means 92 is located in the opening 94 to prevent contaminants carried by the air from entering into the atmospheric chamber where they could affect the operating parameters of the valve means 54.

The conduit 34 is connected to the control chamber 60 (when the shoulder 72 is held against housing by spring 68) to allow any air present in the power chamber 95 of the second servomotor 14 to be evacuated through the control chamber 60 along passage 66 into vacuum chamber 58 out port 96 by way of conduit 98 to the supply conduit 100 for disposition into the exhaust manifold 101. The supply conduit 100 has a first branch 102 going to the first servomotor 12 and a second branch 104 which goes to the front chamber 106 of the second servomotor 14. A wall means 108 located in the second servomotor 14 separates the front chamber 106 from the power chamber 95. With vacuum in both the front chamber 108 and the power chamber 95, spring 110 acts on the wall means 108 and moves piston 112 in the slave cylinder 116 against the guide bearing 114. Piston 112 has a compensatory passage 118 through which fluid from reservoir 120 can flow into the pressurizing chamber 122 for replenishing any loss which may occur in the distribution system of the trailer brakes.

A sway control means 124 is located within the conduit 34 to control the lateral movement of the trailer with respect to the tow vehicle. The sway control means 124 is responsive to oscillatory movement in the trailer and supplies the servomotor 14 with an independent operational signal to activate the servomotor 14 which actuate the brakes in the trailer. This causes the trailer to acclerate at a different rate than the tow vehicle said thereby place a reactionary force on the hitch means (not shown) between the tow vehicle and the trailer. tow-trailer The sway control means 124 is shown in more detail in FIG. 2 as having a housing 126 with an inlet port 128 connected through conduit 34 to the intake manifold 130 through the valve means 54 and an outlet or control port 132 connected to the power chamber 95 of servomotor 14. The housing 126 has a first chamber 134 in which the inlet port 128 is located, as second or control chamber 136 in which the outlet port 132 is located, and an atmospheric chamber 138 in which port 140 going to the atmosphere is located. sleeve A plunger means 142 has a shaft 144 which is held in a guide surface 146 in the housing 126. The shaft 144 has a bore 150 with a plurality of cross bores 152 to provide controlled communication between the first chamber 134 and the second chamber 136. A first seal 151 located on the plunger 144 engages the first bearing or guide surface 146 to prevent air from the atmosphere from entering into the first chamber 134. A diaphragm 154 is located on the plunger surface 156 to prevent communication between the first chamber 134 and the second chamber 136. A first plate 158 engages shoulder 160 on the plunger 156 adjacent the cross bores 152 while a second plate 148 sandwiches the diaphragm 154 therebetween. A resilient end cap 162 extends from the diaphragm 154 past the end of the bore 150 in shaft 144. A stem 190 attached to shaft 144 extends through a sleev 192 in a solenoid means 194. The solenoid means 194 is attached to the housing 126 by an adapter flange 196. The sleeve 192 extends through a bearing surface 198 in the flange 196 in order that the cylindrical body 200 in the solenoid means 192 is aligned within coil 202. A keeper means 204 which is attached to the end of the sleeve 192 engages the flange 196 to establish a stop position for the cylindrical body 200 when coil 202 is de-energized. The keeper means 204 has a washer 206 with a first diameter section 208 and a second diameter section 210 to establish a shoulder 212 thereon. The washer 206 is retained on the stem 190 by a snap ring 214. The flange has a stepped bore 216 with a first diameter 218 and a second diameter 220 which are correspondingly mated with the washer 206. A rubber bumper 215 is located in the stepped bore 216 on the shoulder 222. Because the output force of solenoids increase rapidly as the air gap decreases, there is a tendency for overshooting the desired output resulting in a static instability. Therefore, a wave spring 221, as best shown in FIG. 3 surrounds the second diameter section 218 of the washer 206 and is loosely located between shoulder 212 and the rubber bumper 214. Ideally, the spring rate of the wave spring 221 should be equal to the slope of the solenoid force versus air gap for a fixed current. The equation for the spring rate is as follows:

$$K \text{ spring} = \frac{\alpha \, F \text{ solenoid (air gap, current)}}{\alpha \text{ (air gap)}} \Bigg/ \text{ current}$$

Such a wave spring 221 makes the solenoid output force a direct function of coil current alone. The cylindrical body 200 has a plate 224 attached to the end thereof and extending to the periphery of the coil 202. The sleeve 192 has threads 226 which are engaged by corresponding threads 228 on the plate 224. By adjusting the stem with respect to the sleeve it is possible to set the position at which resilient cap 162 engages a poppet valve means 170.

The poppet valve 170 controls the communication between the control chamber 136 and the atmospheric chamber 138. The poppet valve means 170 has a stem 172 with an annular face 174 on a first end and a second end with a cylindrically shaped section. The first end which is located in the control chamber 136 is in axial alignment with the resilient end cap 162, while the second end extends into the atmospheric chamber 138. A resilient disc 176 which is located on the second end of the stem 172 has a larger opening 178 than the stem to establish a first flow path between the atmospheric chamber 138 and the control chamber 136. A cap 180 is secured to the second end of the stem 172 to retain the resilient disc 176 adjacent a seat 182 on the housing 126. A spring 184 acts on the annular face 174 to urge cap 180 against a seat 186 on the resilient disc 176 to prevent air from flowing along the first flow path and to urge the resilient disc 176 against the seat 182 to prevent air from flowing along the second flow path into the control chamber 136.

A spring 164 surround a guide 166 which extends from around an opening 140 between the control chamber 136 and the atmospheric chamber 138. The spring 164 acts on the plate 148 to urge shoulder 168 against the housing 126 to allow free communication between the first chamber 134, through cross bore 152, along bore 150 and into the second chamber 136.

A filter 188 located in the flow path to opening 140 retains any air borne contaminants to prevent the entry of any foreign matter into the atmospheric chamber 136 which would adversely affect the operation of the poppet valve means 170.

The coil 202 is connected by lead 232 to a comparator means 234 located in the tow vehicle. The comparator means 234 includes electrical circuitry as seen in FIG. 4 which has a pulse width discriminator section 236, a brake hold delay section 238, and a solenoid drive amplifier section 240. The pulse width discriminator section 236 is connected to sensors 242 and 244 located in the trailer through lead 243.

Each of the sensors has a tube 246, as shown in FIG. 1, which is filled with mercury. Each tube 246 has a bolt 248 which runs through the center thereof. Each bolt 246 provides a means whereby the angle of the tube 246 can be adjusted on scale 250. The sensitivity of the sensors or mercury switches 242 and 244 can be set differently for various sizes of trailers. When lateral forces occur in the trailer because of oscillation between the tow vehicle and the trailer, the mercury in the tube closes the circuit between the contacts and permits a sway signal to be sent to the comparator means 234.

The pulse width discriminator section 236 and the brake hold delay section 238 together form a monolithic timing circuit which evaluates the sway signal sent from either sensor 242 or sensor 244. The comparator means 234 has an on-off switch 252 to allow voltage in the battery 253 flow to the electrical circuit through a hot line or lead 254. Lead 254 is connected to a first capacitor 256 through resistor 258 and to the lead 262 from the capacitor 256 to the pulse width discriminator section 236 through resistor 260. The pulse width discriminator section 236 has a reset device therein connected to the lead 254 and a flip-flop timer section connected to a capacitor 261. The capacitor 261 is connected to lead 254 through resistor 264. The output of the pulse width discriminator 236 is carried through a resistor 266 to the base of a first transistor 268. The collector of the first transistor 268 is connected to lead 254 through resistor 270 while the emitter is connected to ground through lead 271. A second capacitor 272 is connected to resistor 270 at a common junction 274 with the collector of the transistor 268. A diode 276 is located to lead 278 which connects to the second capacitor 272 to the base of a third transistor 280. The collector of transistor 280 is connected to a common junction 282 which in turn is connected to lead 254 through resistor 284 and the emitter of transistor 280 is connected to lead 243 through lead 298. The common junction 282 is connected to the brake hold delay means 238 by lead 286. Lead 286 can transmit an actuation signal to flip-flop switch in a timing means 290. A capacitor 292 is connected to the timing means 290 through lead 294 through resistor 296. The timing means 290 is connected to the lead 243 coming from the mercury switches 242 ad 244 by lead 298. A diode 300 prevents the sway signal transmitted through lead 243 from being communicated to the timing means 290. The output of the timing means 290 is communicated through resistor 302 to the base of a third transistor 304. The collector of the third transistor 304 is connected to a junction 306 and the emitter is connected to ground through lead 285. The junction is connected to lead 254 through resistor 308 and through resistor 310 to the base of the fourth transistor 312. The emitter of the fourth transistor 312 is directly connected to lead 254 and the collector is connected through adjustment means 314 to the coil 202 of the solenoid means 194. In addition and indicator 218 is connected to inform the operator that a sway control signal has been sent to operate the servomotor 14 in the trailer. This same sway control signal is tied into the stoplight through lead 322. Further a test circuit 316 has a button 320 which when depressed connects lead 343 to ground through lead 319 to allow an operator to test the indicator light before an actual sway condition occurs.

MODE OF OPERATION OF THE PREFERRED EMBODIMENT

During a braking situation, the operator applies an input force to the brake pedal 16 which operates the servomotor 12 to develop an operational input to activate the master cylinder 18. The output from the master cylinder 18 simultaneously supplies the rear wheels 22 and the piston 48 with an operational force. The piston pivots arm 50 around pin 52 to simultaneously activate brake light switch 208 and move plunger 62 against disc 78 to interrupt vacuum communication between the vacuum chamber 58 and the control chamber 60. Further movement of the plunger 62 moves stem 80 away from the plate 82 to allow air to enter the control chamber and eliminate the pressure differential thereacross. Still further movement of the plunger 62 moves shoulder 81 into engagment with plate 82 to allow air to rapidly enter from the atmospheric chamber 62 to the control chamber 60 around the seat 88. This air under pressure which is a first braking signal, flows in conduit 34 through the sway control means 124, by flowing through the first chamber 134 in the cross bore 152 into bore 150, to the control chamber 136 and unobstructed before passing out port 132 to the power chamber 95. With air in the power chamber 95 and vacuum in the front chamber 106 a pressure differential is created across wall means 108 which moves the push rod 113 to initially close to compensating port 118 and allow the fluid in cylinder 122 to be pressurized and supply the wheel brakes 40 with an activation force at substantially the same time the wheel brakes 22 are activated, to provide uniformity in the braking of the tow vehicle and the trailer. Upon termination of the input force on pedal 16, spring 68 moves plunger 62 and pivots the lever arm 50 around pin 52 to reposition piston 48 in bore 46 and to deactivate brake light switch 208. As plunger 62 moves, spring 86 urges face 88 against cap 84 and resilient disc 82 against seat 90 to close the communication between chamber 62. Further movement of the plunger causes disengagement with the disc 78 to allow vacuum present in chamber 58 to evacuate the air in power chamber 58 to the intake manifold 101. As the air is evacuated from the power chamber 95, the pressure differential is proportionally reduced to permit spring 110 to urge wall 108 toward the power chamber 95 and proportionally reduce the pressure of the fluid in the cylinder and that actuating the wheel brakes 40. When the pressure in the power chamber 95 is equal to that in the vacuum chamber 106, piston 112 is against stop 114 and the pressure in chamber 122 is reduced to zero. As long as the trailer is following the tow vehicle in a straight line, the mercury in sensors 242 and 244 remains in a position away from the ground contact. However, when swaying occurs, a lateral force develops which moves the mercury up the incline plane of the tube 246. When the lateral force is sufficient to move the mercury into engagement with the ground contact, electrical current flows in lead 245 from the battery level 253. When junction 330 is connected to ground through either sensor 242 or sensor 244, capacitor 256 is discharged causing the current in lead 262 to approach ground. With the flip-flop in the first timer means 332 at ground, capacitor 262 supplies an electrical signal or pulse to the timer. This pulse is carried through resistor 266 to the base of transistor 268. With the base of the transistor 268 receiving an electrical signal, current flows from the collector through the emitter to ground. When this flow begins, junction 274 approaches ground and cause capacitor 272 to discharge. At the same time, the emitter of transistor 280 is connected to ground through connection 298 of lead 243 of the mercury switch or sensors 242 or 244. Thus, the transistor 280 can perform a logical "AND+ function when a positive current pulse occurs with the closure of the mercury switch or sensors 242 or 244. If the positive current pulse and the closure pulse of the sensors 242 or 244 are coincidental, the electrical pulse in 286 approaches zero or ground and allow a flip-flop in timer means 290 to receive an electrical signal from capacitor 292 to trigger a latching switch in the timer means 290.

The ON time of the latching switch in the timer means 290 is dependent upon the closure time of the sensors 242 or 244 and a delay time which can be varied with from 0.5 to 1.5 seconds as being normal. The output from the timer means 290 will cause the base of transistor 304 to be turned on and allow current to flow from the emitter to ground. At the same time current flows through transistor 312 to coil 202 and move the cylindrical body 200 and stem 190 into engagement with plunger 144 to seat end cap 162 on face 174 and interrupt communication between chamber 134 and chamber 136. At this time wave spring 221 engages the rubber bumper 215. Further movement of the cylindrical body 220 is opposed by the wave spring 221 and as stated before the spring constant has been selected to provide that the movement or output force thereof is directly proportional to the voltage signal supplied the coil. The movement of plunger 144 moves air control poppet 176 off its seat to allow air to enter into chamber 95 and create a pressure differential in the servomotor in the trailer to momentarily operate the wheel brakes. When the coil current terminates, return spring 164 and the wave spring 221 returns the plunger to the rest position and allow vacuum present in conduit 128 to evacuate chamber 95 and eliminates the pressure differential therein.

As shown in FIG. 5, when the electrical sway signal from sensors 242 or 244 has a time equal to point 340 and the timing signal as initiated by capacitor 256 for the timer 332 is equal to a time period as illustrated by point 342, the second timer means 290 will not be actuated. However, when the sway signal is equal to or greater than the predetermined time period 342, as illustrated by point 344, the second timer means 290 is activated for a period as shown by point 346 equal to the difference in time between points 344 and 342 plus the time delay from point 344 to 346 to provide an adequate braking signal to operate the servomotor in the trailer.

We claim:
1. In a tow vehicle-trailer braking system having a first brake applying servomotor responsive to an operator input for establishing a first braking signal which activates the wheel brakes in the tow vehicle and a second brake applying servomotor responsive to said first braking signal for establishing a second braking signal which activates the wheel brakes in the trailer, sway control means for supplying said second brake applying servomotor with an independent actuation signal to momentarily activate the wheel brakes in the trailer, said sway control means comprising:

a housing having a chamber therein with an entrance port, an exit port and an atmospheric port, said entrance port being adapted to receive said first braking signal which operates said first brake applying servomotor, said exit port being connected to said second brake applying servomotor;

distribution valve means located in said chamber for establishing a first flow path between said entrance port and said exit port;

poppet valve means located in said chamber for establishing a second flow path between said atmospheric port and said exit port;

first resilient means connected to said housing for holding said distribution valve means away from said poppet valve means to permit the first braking signal to be communicated through said first flow path without interruption;

sensor means for establishing a sway signal indicative of any oscillary forces in the trailer switch means connected to said sensor having an adjustment means for varying the relationship between a contact and an electrical conductive medium to change the closure point through which an electrical current flows in establishing said sway signal;

comparator means having a pulse width discriminator means connected to said sensor means for comparing the time period that said sway signal is transmitted from said switch means with a predetermined time period, said pulse width discriminator means inhibiting the transmission of a sway control signal when said sway signal is less than said predetermined time period, said pulse width discriminator means allowing a sway control signal to be produced when said sway signal is longer than said predetermined time period;

delay means for maintaining said sway control signal up to 1.5 seconds after said sway signal has terminated; solenoid means responsive to said sway control signal for moving said distribution valve means to interrupt communication through said first flow path by overcoming said first resilient means to actuate said poppet valve means and allow air to flow through the second flow path from said atmospheric port to establish said independent actuation signal for said second brake applying servomotor; and second resilient means connected to said housing for modifying the output of said solenoid means to limit the rate of movement of said distribution valve as a direct function of said sway control signal.

2. In the tow vehicle-trailer braking system, as recited in claim 1, wherein said comparator means further includes:
drive means connected to said delay means for amplifying said sway control signal to operate said solenoid means.

3. In the tow vehicle-trailer braking system, as recited in claim 2, wherein said comparator means further includes:
indicator means connected to said drive means to visually inform an operator of a sway control signal.

4. In the tow vehicle-trailer braking system, as recited in claim 1, wherein said comparator means further includes:
actuation switch means connected to a source of electrical energy operating the sensor means to provide an operator with an option of selectively utilizing the sway control means.

5. In the tow vehicle-trailer braking system, as recited in claim 1, wherein said comparator means further includes:
indicator means for visually informing an operator of the transmission of a sway control signal to said solenoid means.

6. In a tow vehicle-trailer combination having a brake system with a first brake applying servomotor in the tow vehicle and a second brake applying servomotor in the trailer responsive to an operator input for simultaneously activating the wheel brakes in the tow vehicle and the trailer, sway control means for operating the second brake to independently operate the wheel brakes in the trailer, said sway control means comprising:

a housing having a chamber with an atmospheric port and an exit port, said exit port being connected to the second brake applying servomotor;

valve means located in said chamber for controlling the communication of air through said atmospheric port into said chamber;

plunger means for operating said valve means;

resilient means connected to said housing for biasing said plunger means away from said valve means;

sensor means for establishing a sway signal indicative of oscillary forces in the trailer;

comparator means connected to said sensor means for comparing the duration of said sway signal with a predetermined time period, said comparator only allowing a sway control signal to be produced when said sway signal exceeds said predetermined time period;

delay means for sustaining said sway control signal up to 1.5 seconds after said sway signal terminates, a wave spring located in said housing; and solenoid means responsive to said sway control signal for moving said plunger means into engagement with said wave spring and said valve means by overcoming said. first resilient means, said wave spring modifying the output of said solenoid meas to limit the rate of movement of said valve means as a direct function of said sway control signal to allow air to flow through said atmospheric port, into said chamber, and out the exit port to supply said second brake applying servomotor with an actuation signal for operating the wheel brakes in the trailer to attenuate the sway condition between the two-trailer combination.

7. In the tow vehicle-trailer combinatioin, as recited in claim 6, wherein said comparator means includes:
drive means connected to said delay means for amplifying said sway control signal which operates said solenoid means.

8. In the tow vehicle-trailer combination, as recited in claim 7, wherein said comparator further includes:
indicator means connected to said drive means for providing an operator with a visual indication of the production of a sway control signal.

9. In the tow vehicle-trailer combination, as recited in claim 8, wherein said comparator means further includes:
actuation means connected to a source of electrical energy to permit an operator to activate said solenoid means in the absence of a sway control signal.

* * * * *